(12) United States Patent
Kono et al.

(10) Patent No.: US 8,944,515 B2
(45) Date of Patent: Feb. 3, 2015

(54) VEHICLE SEAT

(71) Applicants: Toyota Boshoku Kabushiki Kaisha, Aichi-ken (JP); Toyota Tsusho Corporation, Nagoya (JP); Mold Technical Office Co., Ltd., Kanagawa-ken (JP)

(72) Inventors: Tetsunori Kono, Ichinomiya (JP); Yoshiyuki Murata, Okazaki (JP); Shota Matsushita, Toyota (JP); Naoya Sato, Nagoya (JP); Toshio Iwasawa, Hadano (JP)

(73) Assignees: Toyota Boshoku Kabushiki Kaisha, Aichi-Ken (JP); Toyota Tsusho Corporation, Nagoya (JP); Mold Technical Office Co., Ltd., Kanagawa-Ken (JP)

( * ) Notice: Subject to any disclaimer, the term of this patent is extended or adjusted under 35 U.S.C. 154(b) by 113 days.

(21) Appl. No.: 13/679,051

(22) Filed: Nov. 16, 2012

(65) Prior Publication Data

US 2013/0127225 A1 May 23, 2013

(30) Foreign Application Priority Data

Nov. 18, 2011 (JP) ................................. 2011-252969

(51) Int. Cl.
*B60N 2/44* (2006.01)
*A47C 7/24* (2006.01)
*A47C 31/02* (2006.01)
*B60N 2/64* (2006.01)
*B60N 2/68* (2006.01)
*B60N 2/70* (2006.01)

(52) U.S. Cl.
CPC .. *B60N 2/64* (2013.01); *B60N 2/68* (2013.01); *B60N 2/686* (2013.01); *B60N 2/7017* (2013.01)

USPC ............. 297/452.48; 297/452.59; 297/218.3; 297/218.5

(58) Field of Classification Search
USPC ................... 297/218.1, 218.3, 218.5, 228.13, 297/452.48, 452.59, 452.6, 452.56; 5/740, 5/655.9
See application file for complete search history.

(56) References Cited

U.S. PATENT DOCUMENTS

| 4,781,966 | A | * | 11/1988 | Taylor | 428/152 |
|---|---|---|---|---|---|
| 5,176,424 | A | * | 1/1993 | Tobita et al. | 297/284.1 |
| 5,704,691 | A | * | 1/1998 | Olson | 297/452.55 |
| 6,582,456 | B1 | * | 6/2003 | Hand et al. | 607/108 |
| 7,946,649 | B2 | * | 5/2011 | Galbreath et al. | 297/218.1 |
| 8,506,012 | B2 | * | 8/2013 | Tanaka et al. | 297/218.1 |
| 2011/0156467 | A1 | | 6/2011 | Murata et al. | |

FOREIGN PATENT DOCUMENTS

JP 10155602 A * 6/1998
JP 2011-130899 7/2011

* cited by examiner

*Primary Examiner* — Jeanette E Chapman
(74) *Attorney, Agent, or Firm* — Greenblum & Bernstein, P.L.C.

(57) ABSTRACT

There is provided a vehicle seat including a seat structure member which has a frame member which configures a seat framework, a pad member which configures an outer shape of the seat and is configured to elastically support an occupant, and a sheet-like elastic fiber body which is disposed on a rear surface of the pad member. The pad member is disposed on the frame member while the elastic fiber body contacting the frame member. The elastic fiber body includes protrusions which protrude toward the frame member and recesses which are closer to the pad member than the protrusions, and the elastic fiber body is configured to come into point or line contact with the frame member by the protrusions.

7 Claims, 9 Drawing Sheets

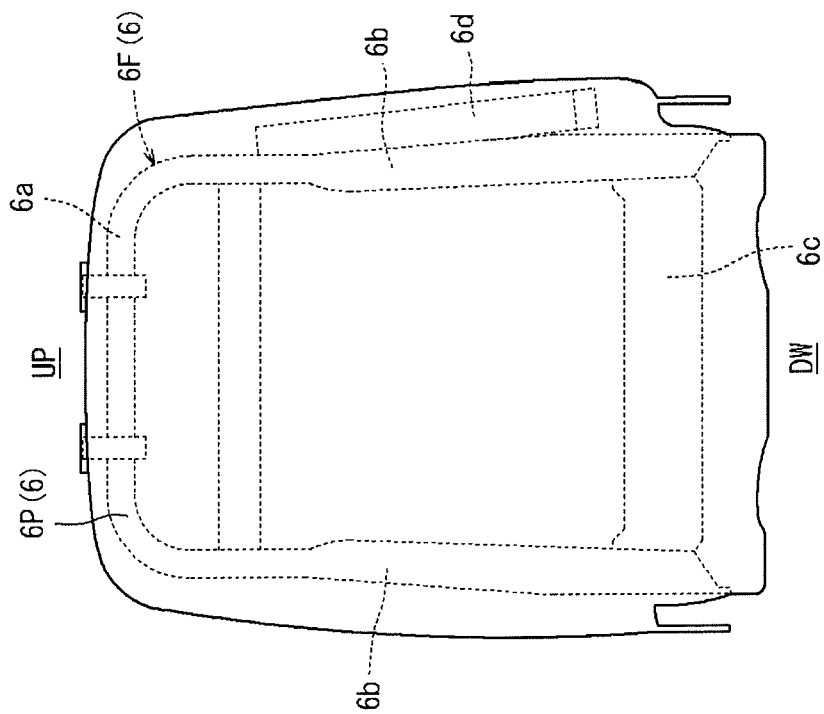
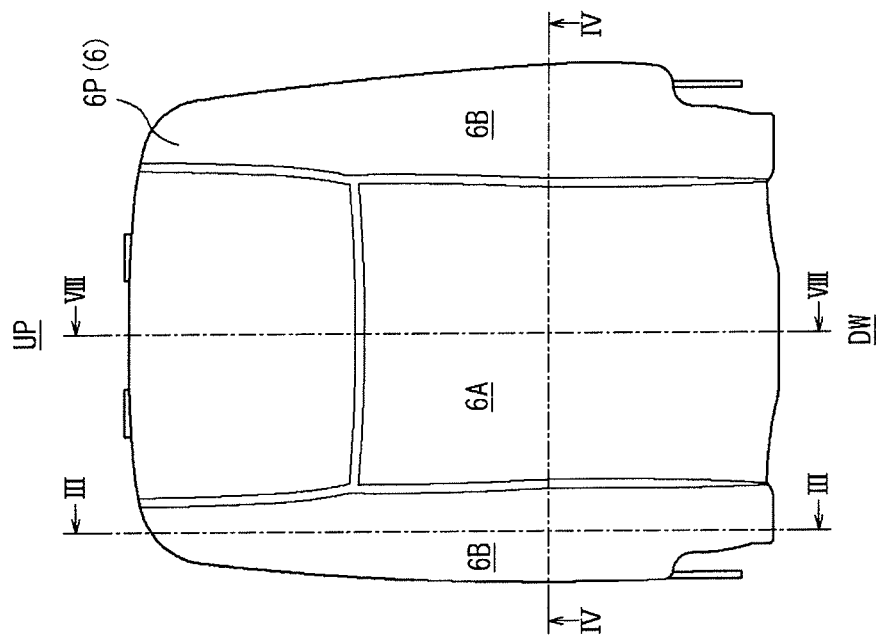

VEHICLE SEAT

BACKGROUND OF THE INVENTION

1. Field of the Invention

The present invention relates to a vehicle seat including a frame member, a pad member, and an elastic fiber body (a sheet-like member disposed on a rear surface of the pad member).

2. Description of the Related Art

JP-A-2011-130899 discloses a vehicle seat including a seat cushion and a seatback (seat structure members).

Each of these seat structure members includes a frame member, a pad member, and an elastic fiber body. The frame member configures a seat framework (typically a metal frame). The pad member configures an outer shape of the seat and capable of elastically supporting an occupant, and can be made of resin foam such as polyurethane foam. The elastic fiber body is a flat sheet-like member (such as a non-woven fabric) and is disposed on a rear surface of the pad member.

In the related-art technique, the pad member is disposed on the frame member while the rear surface (the elastic fiber body) of the pad member contacting the frame member, whereby the pad member is assembled with the frame member.

However, in the related-art technique, since the elastic fiber body is a flat sheet-like member, the elastic fiber body comes into surface contact with the frame member. For this reason, when a person sits on the seat, noises (such as rustling noise) may be generated due to friction between the frame member and the elastic fiber body.

SUMMARY OF THE INVENTION

The present invention has been made in view of the above circumstances, and an object of the present invention is to assemble a pad member with a frame member while avoiding generation of noises as possible.

According to an illustrative embodiment of the present invention, there is provided a vehicle seat comprising a seat structure member which is one of a seat cushion, a seatback, a headrest and an armrest. The seat structure member includes: a frame member which configures a seat framework; a pad member which configures an outer shape of the seat and is configured to elastically support an occupant; and a sheet-like elastic fiber body which is disposed on a rear surface of the pad member, and the pad member is disposed on the frame member while the elastic fiber body contacting the frame member.

In this kind of seat configuration, it is advantageous to assemble the pad member with the frame member while avoiding generation of noises as possible.

Therefore, according to the illustrative embodiment, the elastic fiber body includes protrusions which protrude toward the frame member and recesses which are closer to the pad member than the protrusions, and the elastic fiber body is configured to come into point or line contact with the frame member by the protrusions.

According to this configuration, since the pad member is assembled with the frame member while the frame member and the elastic fiber body come into point contact or line contact with each other, it is possible to prevent or reduce generation of noises due to contact between the frame member and the elastic fiber body.

In the above vehicle seat, the elastic fiber body may be integrated with the pad member during foam formation of the pad member, and the protrusions and the recesses may be formed linearly along a foam direction of a forming raw material of the pad member.

According to this configuration, the protrusions and the recesses are formed linearly along a foam direction of a forming material of the pad member. That is, the forming of the pad member is performed smoothly by the elastic fiber body. Therefore, it is possible to improve the performance (such as seatability and strength) of the pad member.

In the above vehicle seat, a thickness of the elastic fiber body at the protrusions may be same as thicknesses of the elastic fiber body at the recesses.

According to this configuration, since the protrusions and the recesses have the same thickness (it is unnecessary to partially change the thickness of the elastic fiber body), it is possible to suppress an increase in the manufacturing cost of the elastic fiber body.

BRIEF DESCRIPTION OF THE DRAWINGS

In the accompanying drawings:

FIG. 2A is a front view showing a seatback, and FIG. 2B is a rear view showing the seatback;

FIG. 6A is a front view showing an unprocessed elastic fiber body.

FIG. 6B is a front view showing a portion of a press apparatus, and FIG. 6C is a front view showing a processed elastic fiber body;

FIG. 7A is a cross-sectional view showing a forming apparatus and an elastic fiber body, FIG. 7B is a cross-sectional view schematically showing the forming apparatus during the forming process, and FIG. 7C is a cross-sectional view showing a pad member after the forming process;

FIG. 8A is a view showing a state when a forming material is injected, FIG. 8B is a view showing a state when the forming material foams, and FIG. 8C is a view showing another state when the forming material foams; FIG. 9A is a view showing a state when the forming material is injected, FIG. 9B is a view showing a state when the forming material foams, and FIG. 9C is a view showing another state when the forming material foams.

DETAILED DESCRIPTION

Hereinafter, an illustrative embodiment of the present invention will be described with reference to FIGS. 1 to 9C. Throughout the drawings, a front side, a rear side, an upper side, and a lower side of a member are denoted by reference symbols 'F', 'B', 'UP', and 'DW', respectively.

Figure 1:
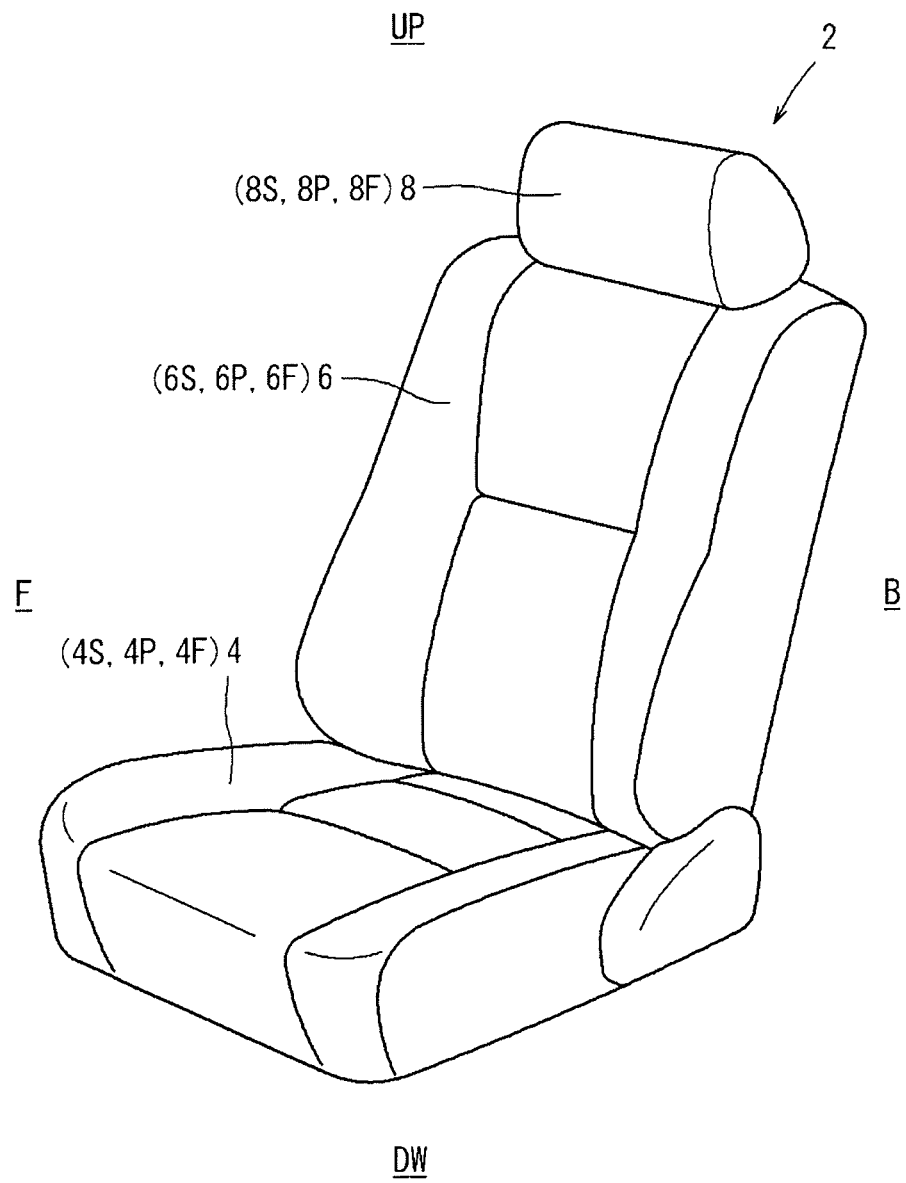
FIG. 1 is a perspective view showing a vehicle seat.

A vehicle seat 2 shown in FIG. 1 includes a seat cushion 4, a seatback 6 which is coupled to the seat cushion 4 to be erectable and tiltable, and a headrest 8 provided above the seatback 6.

Theses seat structure members 4, 6 and 8 include frame members 4F, 6F, and 8F configuring a seat framework, pad members 4P, 6P, and 8P configuring an outer shape of the seat, and skin materials 4S, 6S, and 8S covering the pad members.

In this illustrative embodiment, for example, after the pad member 6P is assembled with the frame member 6F, the pad member 6P is covered with the skin material 6S.

The pad member 6P is disposed on the frame member 6F while a rear surface side (an elastic fiber body 10 to be described below) of the pad member 6P is brought into contact with the frame member 6F (see FIGS. 2A, 2B, and 3). In this configuration, it is advantageous to assemble the pad member 6P with the frame member 6F while avoiding generation of noises due to contact between the frame member 6F and the elastic fiber body 10 as possible.

According to this illustrative embodiment which employs the configuration described below, the pad member 6P is assembled with the frame member 6F while avoiding generation of such noises. In the meantime, a basic configuration of each seat structure member is substantially common in this illustrative embodiment. Therefore, in the below, the seatback 6 will be taken as an example for describing a seat structure member in detail.

[Frame Member]

Figure 3:
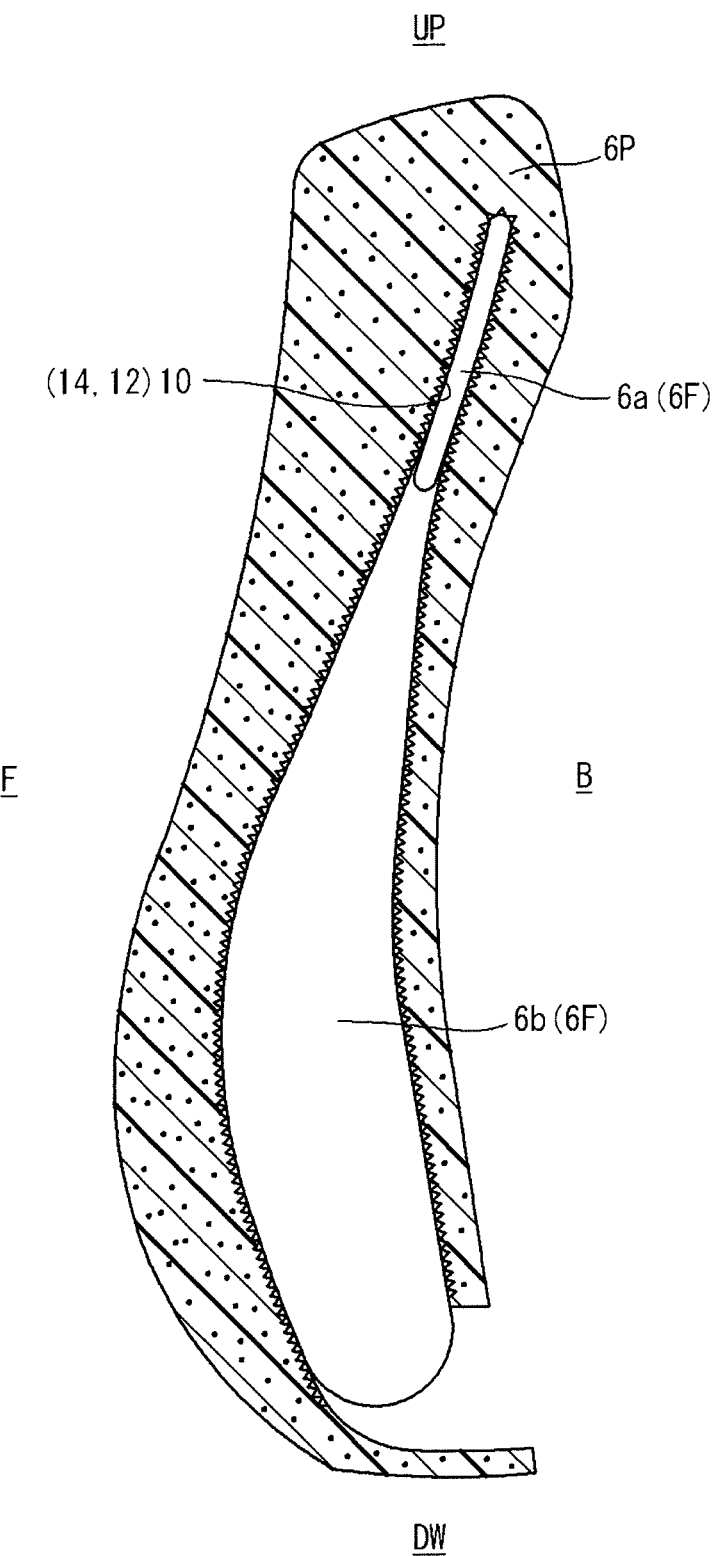
FIG. 3 is a cross-sectional view taken along a line III-III of FIG. 2A.
Figure 4:
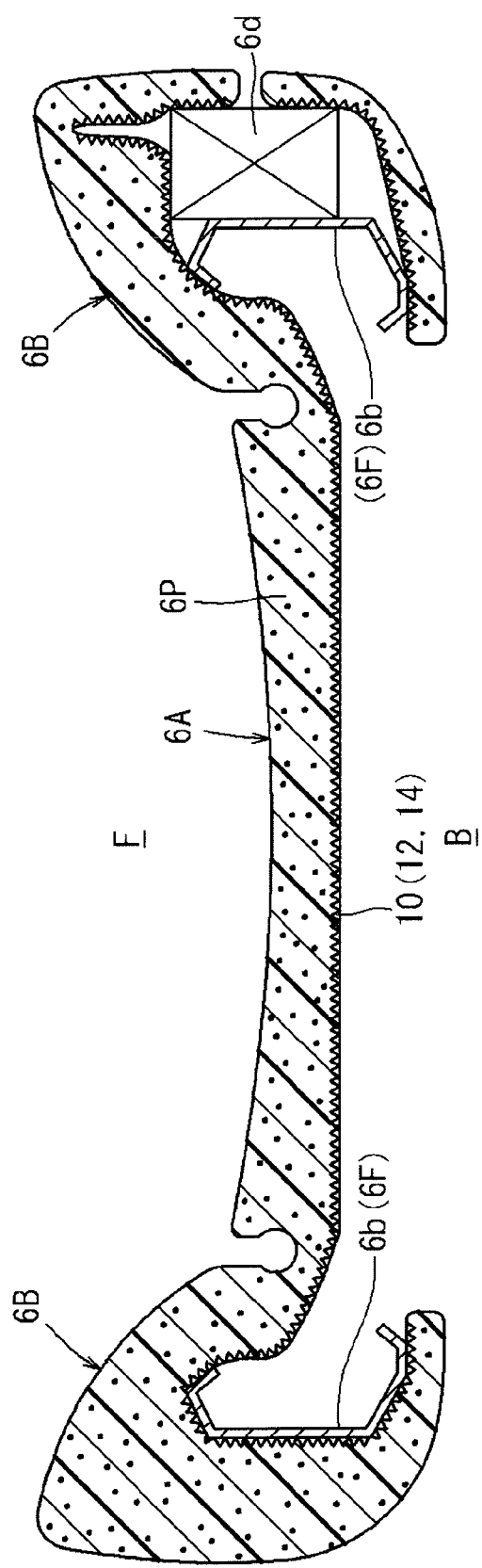
FIG. 4 is a cross-sectional view taken along a line IV-IV of FIG. 2A.

The frame member 6F (an arch frame member) includes an upper frame 6a, a pair of side frames 6b, and a lower frame 6c (see FIGS. 2 to 4).

The upper frame 6a configures an upper portion of the seat and has almost an inverted U shape in a front view. The pair of side frames 6b are flat plate members configuring side portions of the seat, and are attached to the lower end of the upper frame 6a, respectively. The side frames 6b are configured such that a housing 6d capable of accommodating an airbag can be attached thereto. Further, the lower frame 6c is a flat plate member bridging between the pair of side frames 6b at the lower portion of the seat.

Here, the material of the frame member 6F is not particularly limited, but the frame member 6F is typically made of a material having rigidity (such as a metal or a hard resin).

[Pad Member]

The pad member 6P is a substantially rectangular member configuring an outer shape of the seat and capable of elastically supporting an occupant. The pad member 6P includes a seating portion 6A, a pair of bank portions 6B, and the elastic fiber body 10 to be described below (see FIGS. 2A to 4).

The seating portion 6A is a flat portion where an occupant can sit thereon (and which is substantially rectangular in a front view). The seating portion can be provided at a center part of the seatback 6. The pair of bank portions 6B are protruding portions on both sides of the seatback 6, and can support sides of the occupant during cornering of a vehicle, for example.

The material of the pad member 6P is not particularly limited. However, it is advantageous to use resin foam capable of elastically expanding and contracting. As this kind of resin, polyurethane foam (having the density of 10 kg/m$^3$ to 60 kg/m$^3$) can be used.

(Elastic Fiber Body)

Figure 5A:
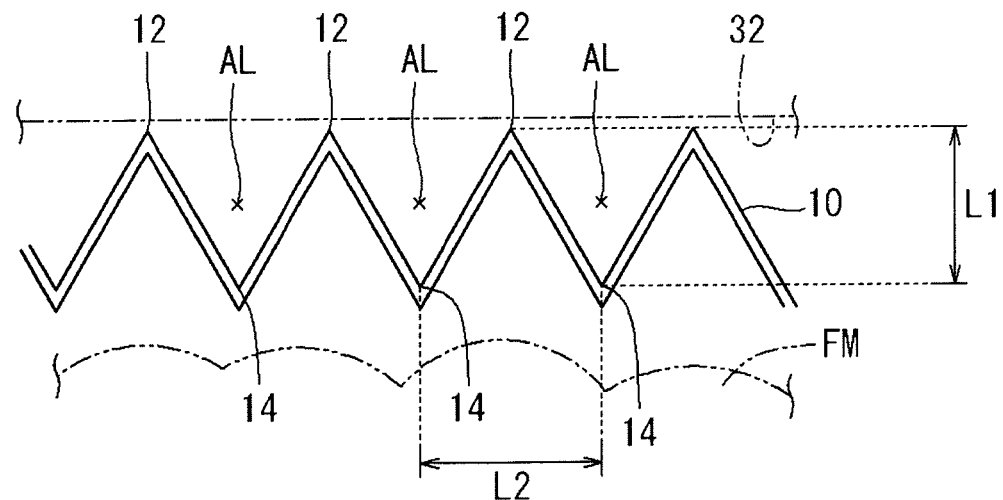
FIG. 5A is a side view showing a portion of an elastic fiber body according to an illustrative embodiment.
Figure 5B:
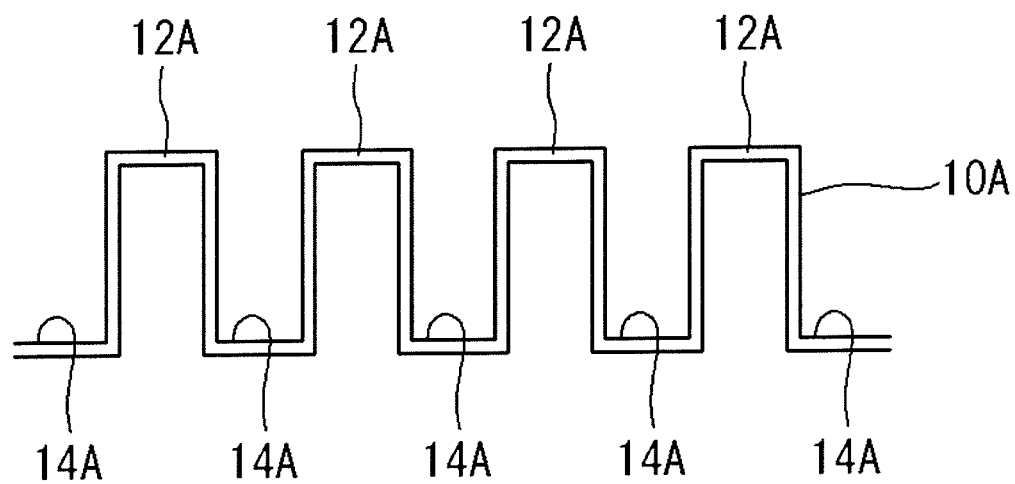
FIG. 5B is a side view showing a portion of an elastic fiber body according to a modification.

The elastic fiber body 10 is a sheet-like member capable of reinforcing the pad member 6P, and includes protrusions 12 and recesses 14 (see FIGS. 3 to 5).

The material of the elastic fiber body 10 is not particularly limited. Examples of the material of the elastic fiber body 10 may include natural fibers (such as animal-based natural fibers and plant-based natural fibers), synthetic fibers (such as polypropylene fibers, polyester fibers, polyamide fibers, acrylic fibers), and mixture of those fibers.

Here, since it is relatively easy to bring back the elastic fiber body 10 to a raw material stage (for example, a fiber state), the elastic fiber body 10 is superior to polyurethane foam in recyclability. Above all, thermoplastic resin fibers such as polypropylene fibers and polyester fibers can melt by heating, it is possible to easily bring back the thermoplastic resin fibers to a resin stage which is a raw material.

The elastic fiber body 10 can be formed by laminating the above-mentioned fibers and three-dimensionally interlacing them by a method such as needle-punch or spun lace. Alternatively, the elastic fiber body 10 can be formed by knitting the above-mentioned fibers.

In this illustrative embodiment, the elastic fiber body 10 is disposed on a rear surface of the pad member 6P (a side opposing the frame member 6F) such that the elastic fiber body can come into contact with the frame member 6F.

(Protrusions and Recesses)

The protrusions 12 are protruding portions of the elastic fiber body 10, and protrude toward the frame member 6F (see FIGS. 3 to 5). The recesses 14 are recessed portions of the elastic fiber body 10, and are closer to the pad member 6P than the protrusions 12.

In this illustrative embodiment, a portion of the elastic fiber body 10 or the entire elastic fiber body 10 is made into in a zigzag folded state in the thickness direction such that the protrusions 12 and the recesses 14 can be alternately formed. The protrusions 12 are substantially triangular protruding portions, and have the same thicknesses as that of the elastic fiber body 10. The recesses 14 are substantially triangular recessed portions, and have the same thicknesses as that of the elastic fiber body 10.

Also, in this illustrative embodiment, the protrusions 12 and the recesses 14 can be formed linearly along a flow direction of a forming material FM during a forming process of the pad member 6P (see FIG. 5 and FIGS. 7 to 9).

For example, in the seating portion 6A, the protrusions 12 and the recesses 14 can be formed linearly in the longitudinal direction of a forming apparatus 30 (to be described below) (the vertical direction of the seat at the seatback). Further, in the bank portions 6B, the protrusions 12 and the recesses 14 can be formed linearly in the vertical direction of the forming apparatus 30 (the width direction of the seat in the seatback).

Here, the heights L1 and widths L2 of the protrusions 12 are not particularly limited (see FIG. 5, and Table 1).

For example, each of the heights L1 and widths L2 of the protrusions 12 is independently set to 10 mm or more, so that excessive impregnation of the forming material FM into the elastic fiber body 10 is appropriately suppressed (the elastic fiber body 10 can have good impregnating property). Further, each of the heights L1 and widths L2 of the protrusions 12 is independently set to 20 mm or less, so that material shortage of the pad member 6P can be appropriately suppressed (the elastic fiber body 10 can have good formability).

That is, each of the heights L1 and widths L2 of the protrusions 12 is independently set to a value which is 10 mm or more and 20 mm or less, so that the elastic fiber body 10 can have good performance (an impregnating property, formability, and suppressing of noises).

(Modification)

As the configuration of the protrusions and the recesses, it is possible to take not only the above-mentioned configuration but also various configurations. For example, referring to FIG. 2B, it is possible to make a portion of an elastic fiber body 10A or the entire elastic fiber body 10A into a folded shape uneven in the thickness direction.

Protrusions 12A are substantially rectangular protruding portions, and have the same thicknesses as that of the elastic fiber body 10A. Recesses 14A are substantially rectangular recessed portions, and have the same thicknesses as that of the elastic fiber body 10A.

[Process of Manufacturing Pad Member]

In this illustrative embodiment, according to the following first and second processes, the pad member 6P is integrated with the elastic fiber body 10 during formation thereof (see FIGS. 6 to 9).

A first process: the protrusions 12 and the recesses 14 are formed in the elastic fiber body 10.

A second process: the pad member 6P is integrated with the elastic fiber body 10 during formation thereof.

(First Process)

Figure 6A:
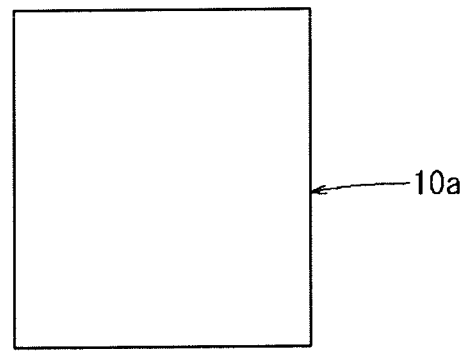
FIGS. 6A to 6C are views showing a procedure for manufacturing an elastic fiber body, where
Figure 6B:
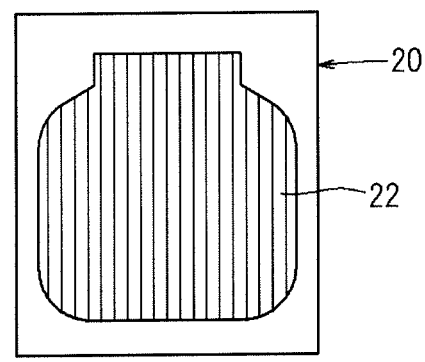
Figure 6C:
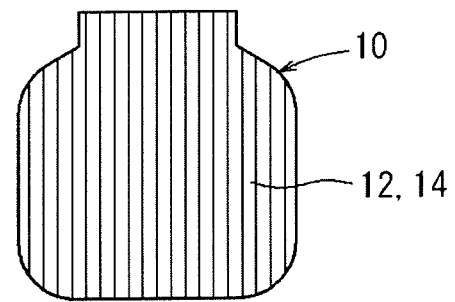

In the first process, a press apparatus 20 (rectangular member) is used to form the protrusions 12 and the recesses 14 in the elastic fiber body 10 (see FIG. 6). At the rear surface of the press apparatus 20, a processing portion 22 (having a concave-convex shape corresponding to the protrusions 12 and the recesses 14) is provided.

An unprocessed (flat) elastic fiber body 10a is disposed in the press apparatus 20 and is pressurized, whereby the protrusions 12 and the recesses 14 are formed in the elastic fiber body 10 (a zigzag pattern in a cross-section is formed). In the elastic fiber body 10 formed in that way, the thicknesses of the protrusions 12 and the thicknesses of the recesses 14 become the same.

(Second Process)

Figure 7A:
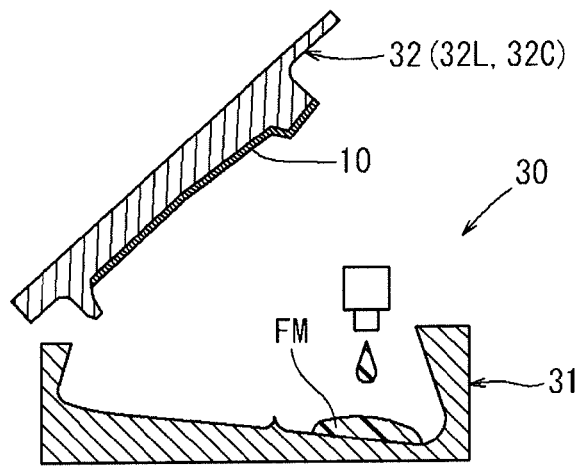
FIGS. 7A to 7C are views showing a procedure for manufacturing a pad member, where
Figure 7B:
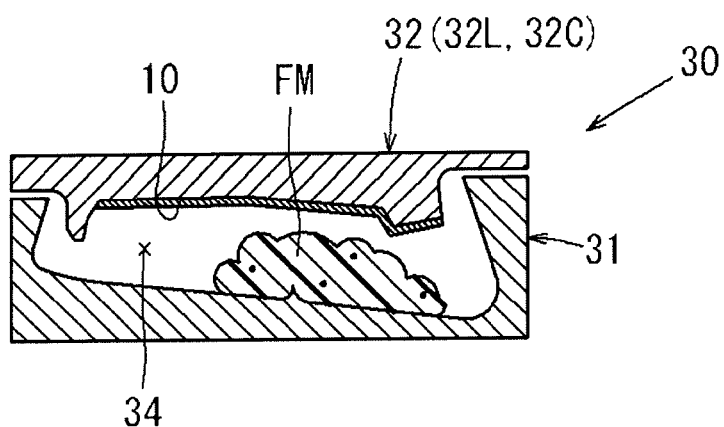
Figure 7C:
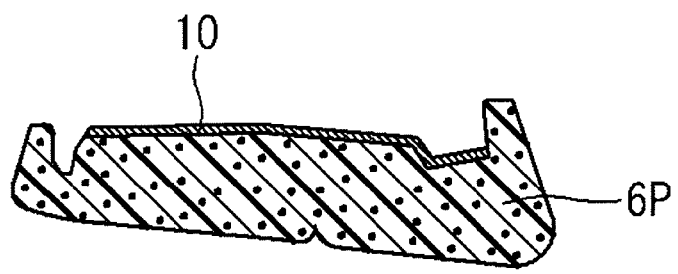
Figure 8A:
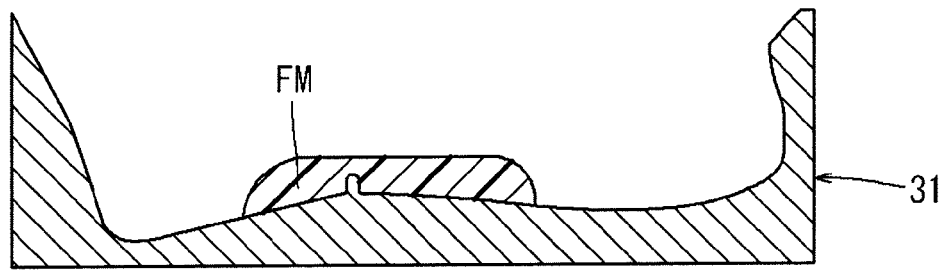
FIGS. 8A to 8C are cross-sectional views of the forming apparatus taken along a line VIII-VIII of FIG. 2A and showing a forming process of a portion of the pad member, where
Figure 8B:
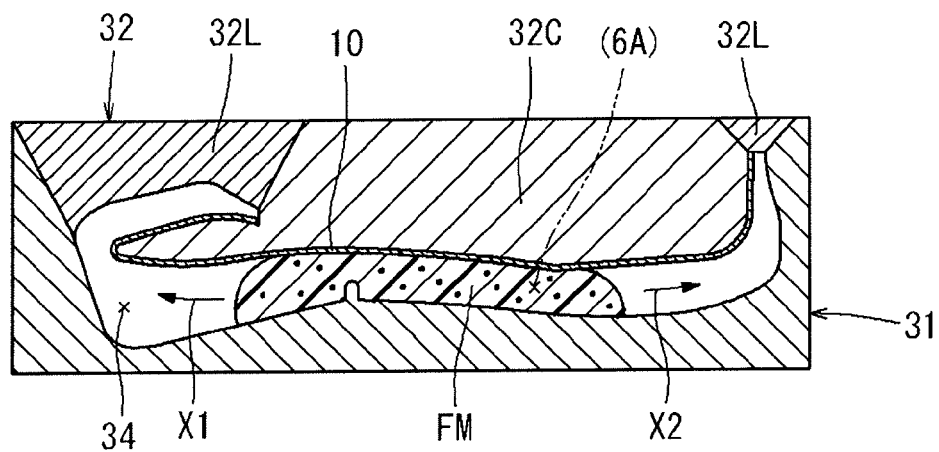
Figure 8C:
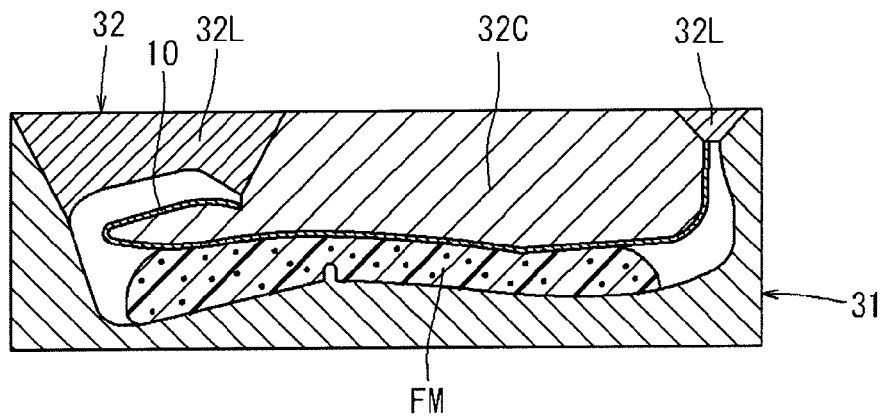
Figure 9A:
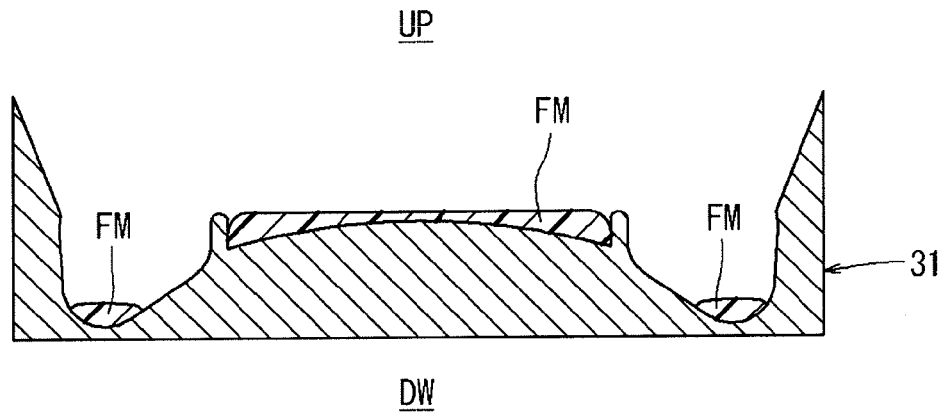
FIGS. 9A to 9C are cross-sectional views of the forming apparatus taken along a line IV-IV of FIG. 2A and showing a forming process of another portion of the pad member, where
Figure 9B:
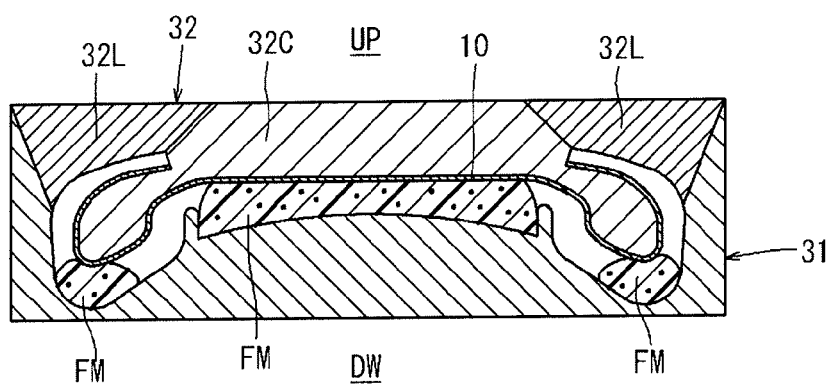

In the second process, the forming apparatus 30 is used to integrate the pad member 6P with the elastic fiber body 10 during formation thereof (see FIGS. 7 to 9).

Here, the forming apparatus 30 is a member having a substantially rectangular shape in a top view, and includes a first mold 31, a second mold 32, and a cavity 34 which is formed between the two molds.

A surface of the first mold 31 has a shape entirely corresponding to a shape of the seating portion of the pad member 6P. The second mold 32 can be divided into a side mold 32L and a center mold 32C whose rear surfaces have shapes corresponding to a shape of the rear surface of the pad member 6P (see FIGS. 8 to 9). At the second mold 32, a discharge hole (not shown) for discharging air in the cavity 34 to the outside can be formed. Also, in this illustrative embodiment, it is possible to form a through-hole at the center of the side mold 32L such that the center mold 32C can be fit into the through-hole.

The cavity 34 is a space portion corresponding to the outer shape of the pad member 6P, and the pad member 6P can be formed by foaming the forming material FM.

(Foaming of Forming Material)

In the present illustrative embodiment, the forming material FM is injected into the cavity 34 while the elastic fiber body 10 is disposed on the rear surface of the second mold 32 (see FIGS. 7 to 9). Next, the first mold 31 and the second mold 32 are closed with each other, and the forming material FM is caused to be foamed in the cavity 34.

Then, at the center (a portion corresponding to the seating portion 6A) of the forming apparatus 30, the forming material FM foams in the longitudinal direction of the forming apparatus 30 (see arrows X1 and X2 in FIG. 8B). At this time, the forming material FM can smoothly foam along the protrusions 12 and the recesses 14 (linear shapes) extending in the same longitudinal direction.

Figure 9C:
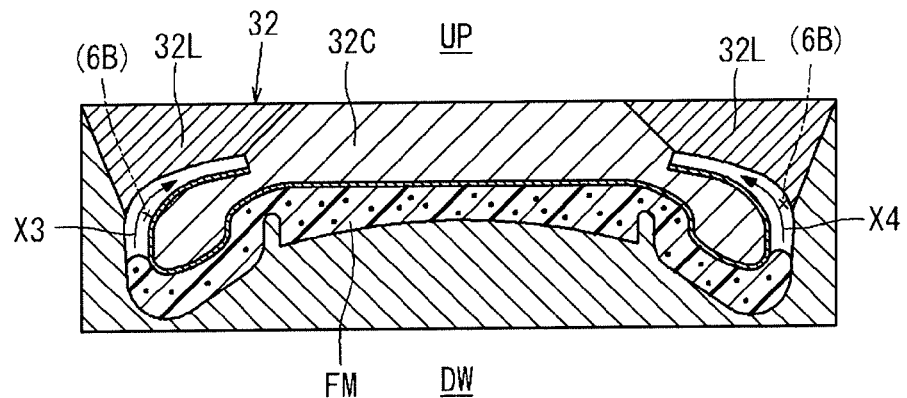

Further, at the edge portions (portions corresponding to the bank portions 6B) of the forming apparatus 30, the forming material FM foams in the vertical direction (see arrows X3 and X4 in FIG. 9C). At this time, the forming material FM can smoothly foam along the protrusions 12 and the recesses 14 extending in the vertical direction.

That is, in this illustrative embodiment, the forming material FM is smoothly foamed (flowability is improved). Therefore, it is possible to prevent or reduce the retention of air in the cavity 34 (which is the cause of the material shortage of the pad member).

Also, in the second process, the elastic fiber body 10 is pressed against the rear surface of the second mold 32 by the foam pressure of the forming material FM (see FIG. 5). At this time, a gap (air layer AL) is formed between the elastic fiber body 10 (the recesses 14) and the second mold 32.

Here, the forming material FM is impregnated into the elastic fiber body 10 and solidifies, so that the elastic fiber body 10 can be integrated with the pad member 6P. In this illustrative embodiment, at a portion (protrusions 12) of the elastic fiber body 10, the forming material FM is impregnated and is cured (is cured in rivet shapes). In contrast, at the recesses 14 of the elastic fiber body 10, since the air layer AL is formed between the recesses 14 and the second mold 32, the forming material FM is maintained to be rarely impregnated (see FIG. 5).

[Process of Assembling Pad Member]

Referring to FIGS. 1, 3, and 4, the pad member 6P is assembled with the frame member 6F and is covered with the skin material 6S.

In this illustrative embodiment, the elastic fiber body 10 comes into line contact with the frame member 6F (6a to 6c) by the protrusions 12. Therefore, according to this illustrative embodiment, it is possible to further reduce or prevent generation of noises due to contact between the frame member 6F and the elastic fiber body 10 as compared to a case where the elastic fiber body 10 and the frame member 6F come into surface contact with each other.

Further, the forming material FM is impregnated into a portion (the protrusions 12) of the elastic fiber body 10, and is cured (cured in rivet shapes). Therefore, it is possible to improve the stability of attachment of the pad member 6P and the elastic fiber body 10.

As described above, according to this illustrative embodiment, the elastic fiber body 10 comes into line contact with the frame member 6F by the protrusions 12. Therefore, it is possible to prevent or reduce generation of noises due to contact between the frame member 6F and the elastic fiber body 10.

Further, in this illustrative embodiment, the protrusions 12 and the recesses 14 are formed linearly along the foam direction of the forming material FM. Therefore, it is possible to smoothly foam the forming material FM. As a result, it is possible to avoid occurrence of material shortage of the pad member 6P (recessed portions due to the retention of air in the cavity), and thus to improve the performance (such as the seatability and strength) of the pad member 6P.

Further, in this illustrative embodiment, the thicknesses of the protrusions 12 and the recesses 14 are same (it is not necessary to partially change the thickness of the elastic fiber body), and therefore, it is possible to suppress an increase in the manufacturing cost of the elastic fiber body 10.

Therefore, according to this illustrative embodiment, it is possible to assemble the pad member 6P with the frame member 6F while avoiding the generation of noises as possible.

Test Examples

Hereinafter, an illustrative embodiment of the present invention will be described with reference to test examples, however, the present invention is not limited to those test examples.

In these test examples, pad members of a vehicle seat for a single passenger were formed. The capacity (volume) of each cavity was set to 0.018 m³.

An amount of polyurethane raw material (forming material) injected into each cavity was set to 1.26 kg. As the polyurethane raw material, polyol ("TLB-213" made by Asahi Glass Co., Ltd.) and isocyanate ("Coronate C1021" made by Nippon Polyurethane Industry Co., Ltd.) were used.

Further, a mold temperature (time) during foam formation was set to 65° C.±3° C. (5 minutes), and a mold temperature (time) during curing was set to 65° C.±3° C. (5 minutes). Under this condition, the foam pressure of urethane was 0.8 kgf/cm² to 1.0 kgf/cm².

Examples

As pad members of first to third examples, elastic fiber bodies having protrusions having appropriately set heights and widths were used (see Table 1).

As an elastic fiber body of each example, a non-woven fabric (having a thickness of 10 mm) of polyester fibers was used. The density of the pad member (polyurethane foam) of each example was set to 57 kg/m³.

Comparative Example

In a comparative example, a pad member having a flat elastic fiber body (an elastic fiber body without protrusions and recesses) was made. The other forming conditions were the same as those for the examples.

(Test Methods and Evaluation Methods)

(1) As a test for the impregnating property, the degree of oozing of the forming material from the elastic fiber body was visually judged by its appearance. At this time, the degree of oozing of the comparative example was defined as '3'. Then, a case where a degree of oozing of the forming material was judged to be lower than that of the comparative example by its appearance was evaluated as '4', and a case where a degree of oozing of the forming material was judged to be significantly lower than that of the comparative example was evaluated as '5'.

(2) As a test for formability, existence/non-existence of material shortage (recessed portions) of each pad member was visually judged by its appearance. In this test, in a case where 1000 products were formed, a case where material shortage (recessed portions) occurred in two or three pad members was evaluated as '3'. Also, a case where material shortage (recessed portions) occurred in three to six pad members was evaluated as '2'. Further, a case where material shortage (recessed portions) occurred in one or two pad members was evaluated as '4', and a case where material shortage (recessed portions) did not occur in any pad member was evaluated as '5'.

(3) In a test for generation of noises, after assembling each pad member with a frame member, the pad member was swung forward and backward while being weighted with 65 kgf. In this case, the loudness of noises generated in the comparative example (a case where noises were apparently generated) was evaluated as '3'. Also, a case where noises were lower than that of the comparative example (a case where noises was faintly generated) was evaluated as '4', and a case where noises were rarely generated was evaluated as '5'.

(4) A cost (manufacturing cost) is the total cost of the material cost and production cost of each pad member, and the cost of the comparative example was evaluated as '3'.

Results of the individual tests are shown in Table 1.

TABLE 1

| | Comparative Example | First Example | Second Example | Third Example |
|---|---|---|---|---|
| Elastic fiber body | Provided | Provided | Provided | Provided |
| Protrusions and recesses in elastic fiber body | Not provided | Provided | Provided | Provided |
| (Width of groove) × (Height of groove) (mm) | 0 mm | 0 < Groove < 10 mm | 10 mm ≤ Groove ≤ 20 mm | Groove > 20 mm |
| Impregnation | 3 | 4 | 5 | 5 |
| Formability | 3 | 4 | 5 | 2 |
| Noises | 3 | 4 | 5 | 5 |
| Cost | 3 | 3 | 3 | 3 |
| Comprehensive Judgment | 12 | 15 | 18 | 15 |

[Results and Analysis]

Referring to Table 1, it was found that the pad members of the first to third examples can appropriately prevent the generation of noises as compared to the pad member of the comparative example.

Also, the pad members of the first to third examples had the degrees of impregnation into the elastic fiber bodies lower than that of the comparative example. In other words, in the comparative example, the forming material was impregnated into the almost entire surface of the elastic fiber body. In contrast, in each of the first to third examples, the forming material was impregnated into only a portion (protrusions) of the elastic fiber body. Therefore, it was found that, according to the pad members of the first to third examples, it is possible to appropriately maintain the inherent flexibility of each pad member (elastic fiber body), or the like.

Further, it was found that the pad members of the first and second examples have superior formability as compared to the comparative example. Furthermore, it was found that the pad members of the first to third examples can be made at costs which compare favorably with that of the pad member of the comparative example.

Moreover, in the pad members of the first to third examples, when comprehensively judging the generation of noises, the impregnating property, the formability, and the cost, evaluation superior to the comparative example can be obtained. Particularly, in the pad member of the second example, superior evaluation can be obtained in all of the generation of noises, the impregnating property, the formability, and the cost.

From the above results, it was found that, according to the pad members of the first to third examples, it is possible to assemble the pad members with the frame members while avoiding the generation of noises as possible.

While the present invention has been shown and described with reference to certain illustrative embodiments thereof, it will be understood by those skilled in the art that various changes in form and details may be made therein without departing from the spirit and scope of the invention as defined by the appended claims.

(1) In the above illustrative embodiment, the linear protrusions 12 and the linear recesses 14 have been exemplified, but are not intended to limit the configuration (such as shapes, numbers, formation positions, and thicknesses) of the protrusions and the recesses. For example, the protrusions and the recesses can take various shapes such as dot shapes (a configuration capable of point contact), lattice shapes, and concentric shapes. Also, the cross-sectional shape of the elastic fiber body can take not only the above-mentioned zigzag or uneven shape but also various shapes such as waveforms.

(2) Also, in the above illustrative embodiment, the linear protrusions 12 and the linear recesses 14 are formed along the foam direction of the forming material FM. However, it is also possible to form the protrusions 12 and the recesses 14 independently of the foam direction. For example, independently of positions (such as the seating portion and the bank portions) of the seat, the protrusions and the recesses may be formed linearly in the front/rear direction or width direction of the seat, or in linear shapes inclined with respect to the front/rear direction or width direction of the seat, and can also be formed in a waveform or a zigzag linear shape.

(3) Further, in the elastic fiber body, it is also possible to make the thicknesses of the protrusions different from the thicknesses of the recesses.

(4) Also, in the above illustrative embodiment, the configuration of the forming apparatus 30 has been exemplified, but is not intended to limit the configuration of the forming apparatus 30. For example, the second mold can be configured as a single member.

(5) Further, in the above illustrative embodiment, an example in which the protrusions 12 and the recesses 14 are formed with the press apparatus 20 has been described, but is not intended to limit a method of forming each member. For example, uneven processing may be performed on the circumferential surfaces of two rolls (cylindrical members), and then an elastic fiber body may be passed between the two rolls, whereby protrusions and recesses are formed.

(6) Furthermore, in the above illustrative embodiment, an example in which the elastic fiber body 10 is integrated with the pad member 6P during the forming process of the pad member 6P has been described. However, it is possible to attach the elastic fiber body 10 to the pad member by bonding or fusing after forming the pad member.

(7) In addition, in the above illustrative embodiment, the pad member 6P of the seatback 6 has been described as an example. The configuration of this illustrative embodiment can be applied to pad members of various seat structure members such as the pad member 4P of the seat cushion 4, a pad member of a headrest or a pad member of an armrest.

What is claimed is:

1. A vehicle seat comprising a seat structure which is one of a seat cushion, a seatback, a headrest and an armrest, the seat structure including:

a frame which defines a seat framework;

a pad which defines an outer shape of the seat and is configured to elastically support an occupant; and a sheet-like elastic fiber body which is disposed on a rear surface of the pad, wherein the pad is disposed on the frame while the elastic fiber body contacts the frame, wherein the elastic fiber body includes protrusions which protrude toward the frame and recesses between the protrusions, and the elastic fiber body is configured to come into point or line contact with the frame by the protrusions, and wherein the pad is made of resin foam, and when forming material of the resin foam is foamed, the pad is formed to include protrusions and recesses between the protrusions, the forming material is impregnated to the protrusions of the elastic fiber body and cured, and the protrusions and the recesses of the elastic fiber body are formed to correspond to the protrusions and the recesses of the pad.

2. The vehicle seat according to claim 1, wherein the elastic fiber body is integrated with the pad during foam formation of the pad, and wherein the protrusions of the elastic fiber body and the recesses of the elastic fiber body are formed linearly along a foam direction of a forming raw material of the pad.

3. The vehicle seat according to claim 1, wherein a thickness of the elastic fiber body at the protrusions of the elastic fiber body is same as a thickness of the elastic fiber body at the recesses of the elastic fiber body.

4. The vehicle seat according to claim 1, wherein a height of the protrusions of the elastic fiber body ranges from 10 mm to 20 mm.

5. The vehicle seat according to claim 4, wherein a width between adjacent protrusions of the elastic fiber body ranges from 10 mm to 20 mm.

6. The vehicle seat according to claim 1, wherein an amount of impregnation of the forming material to the recesses of the elastic fiber body is smaller than an amount of impregnation of the forming material to the protrusions of the elastic fiber body.

7. The vehicle seat according to claim 1, wherein the elastic fiber body contacts the frame on at least two opposing sides of the frame.

* * * * *